3,759,741
NOVEL INTUMESCENT COATED ARTICLES
Shirley H. Roth, Highland Park, N.J., assignor to Cities Service Company, New York, N.Y.
No Drawing. Filed Nov. 5, 1971, Ser. No. 196,212
Int. Cl. C09d 5/18; C09k 3/28
U.S. Cl. 117—136
9 Claims

ABSTRACT OF THE DISCLOSURE

Articles coated with intumescent compositions which comprise certain polycyclic aromatic polysulfonamides, such as naphthalene, anthracene, phenanthrene, biphenyl, and terphenyl polysulfonamides. The intumescent agents may be prepared by conventional techniques and may be employed in conjunction with conventional additives. Among the preferred intumescent agents are the 1,5-, 2,6- and 2,7-naphthalenedisulfonamides and the o,o'-, m,m'- and p,p'-disulfonamidobiphenyls.

BACKGROUND OF THE INVENTION

Field of the invention

This invention relates to intumescent compositions and more particularly relates to such compositions containing a one-component intumescent agent.

Description of the prior art

It is known that a substrate may be protected from heat and fire by the application of an intumescent composition. Intumescent compositions of the prior art usually contain an intumescent agent having at least three components, i.e., a carbonific, a spumific, and a catalyst; and they are typically characterized by the disadvantages of high cost, low spreading rate, relatively poor efficiency, poor water resistance, and poor weatherability.

As disclosed in U.S. Pat. 3,535,130, it has already been discovered that a one-component intumescent agent has advantages over multicomponent intumescent agents. However, the intumescent agents of the patent have poor adherence to substrates and have an undesirable degree of moisture sensitivity.

SUMMARY OF THE INVENTION

An object of this invention is to provide a novel class of one-component intumescent agents.

Another object is to provide such intumescent agents having good efficiency and a low level of moisture sensitivity.

These and other objects are attained by using as intumescent agents polysulfonamido derivatives of polycyclic aromatic compounds wherein all aromatic rings are fused rings or rings separated by a valence bridge.

DESCRIPTION OF THE PREFERRED EMBODIMENTS

The intumescent agents of the invention may be polysulfonamide derivatives of any polycyclic aromatic compound wherein all aromatic rings are fused rings or rings separated by a valence bridge. However, they are preferably polysulfonamide derivatives of a substituted or unsubstituted polycyclic aromatic hydrocarbon, such as naphthalene, anthracene, phenanthrene, biphenyl, or terphenyl. They contain at least two sulfonamide groups attached to ring carbon atoms and have at least one free reactive ring position. Any other reactive ring positions may be occupied by additional sulfonamide groups or by other substituents, such as chloro, bromo, nitro, etc. Other substituents on one or more ring carbon atoms are sometimes advantageous, e.g., to enhance flame retardance or impart other desirable properties; but they usually decrease the degree to which the compounds intumesce. Therefore, when the degree of intumescence is of paramount importance, the preferred compounds are the polysulfonamide derivatives of hydrocarbons. The positioning of the sulfonamide groups with respect to one another and/or other substituents has not been found to be critical.

Exemplary of the intumescent agents of the invention are the 1,4-, 1,5-, 1,6-, 2,5-, 2,6- and 2,7-naphthalenedisulfonamides, 2 - bromo - 1,5-naphthalenedisulfonamide, 4-chloro - 1,5 - naphthalenedisulfonamide, 4-nitro-1,5-naphthalenedisulfonamide, 1,5,6-naphthalenetrisulfonamide, 1,4,6,7,8 - naphthalenepentasulfonamide, 1,6-anthracenedisulfonamide, 1,5-phenanthrenedisulfonamide, the o,o'-, m, m'- and p,p'-disulfonamidobiphenyls, the corresponding disulfonamidoterphenyls, etc. The preferred intumescent agents are the naphthalenedisulfonamides and the disulfonamidobiphenyls.

When not commercially available, the intumescent agents may be prepared by treating the appropriate polycyclic aromatic compound with chlorosulfonic acid and converting the resulting sulfonyl chloride to the sulfonamide, essentially as taught in Ernest H. Huntress and Frederick H. Carten, 'Identification of Organic Compounds. III. Chlorosulfonic Acid as a Reagent for the Characterization of Aromatic Ethers," Journal of the Americal Chemical Society, vol. 62, pp. 603–604 (1940).

For use in protecting a substrate from heat and fire, the intumescent agents of the invention may be applied in any suitable manner, e.g., electrodeposition, spraying of powdered intumescent agent onto an adhesive substrate, etc. However, it is usually preferred to compound the intumescent agent with a binder, e.g., nitrocellulose, and optionally also with one or more of the other ingredients conventionally used in intumescent compositions, e.g., stabilizers, dispersing agents, pigments, driers, biocides, antifoamers, thickeners, protective colloids, fillers, blowing agents, etc.; disperse the composition in a suitable liquid medium, e.g., water or a solvent or solvent mixture; and apply the coating composition thus formed to the substrate to be protected. As is the case with conventional intumescent coating compositions, it is frequently convenient to apply these coating compositions in the form of a paint having a solids content of about 10–70% by weight and an intumescent agent/binder weight ratio of about 0.075–14/1 to deposit a coating having a dry thickness of about 0.001–0.75 inch.

The intumescent agents of the invention are efficient, have low moisture sensitivity, and intumesce without flaming to form foams having good volume, cell structure, and adherence to substrates, such as wood, metal, and plastics. They are also useful as flame retardants in normally flammable compositions.

The following examples are given to illustrate the invention and are not intended as a limitation thereof. Unless otherwise specified, parts mentioned are parts by weight.

Example I

Place one gram of 1,5-naphthalenedisulfonamide in an aluminum pan and flame it with a propane torch. The compound intumesces without melting or flaming to form an excellent volume of foamed char having good structure and resiliency.

Example II

Ball mill a mixture of 150 parts of 1,5-naphthalenedisulfonamide, 52 parts of nitrocellulose, 12 parts of tricresyl phosphate, 11.2 parts of titanium dioxide, and 219 parts of methyl isobutyl ketone to form a coating composition. Apply the composition to four poplar test panels at a spreading rate of 100 sq. ft./gal. Test the panels in accordance with the two-foot tunnel test described in H. L. Vandersall, "The Use of a Small Flame Tunnel for Evaluating Fire Hazard," Journal of Paint Technology, vol. 39, No. 511, pp. 494–500 (1967). The panels have an average flame spread rating of 5 and an average insulative value of 100° C.

Example III

Repeat Exaample II except for substituting 2,6-naphthalenedisulfonamide, 2,7 - naphthalenedisulfonamide, o,o'-disulfonamidobiphenyl, m,m'-disulfonamidobiphenyl, and p,p',disulfonamidobiphenyl, respectively, for the 1,5-naphthalenedisulfonamide. Similar results are observed.

Similar results are also observed when the other intumescent agents mentioned in the specification are substituted for the intumescent agents of the examples.

It is obvious that many variations may be made in the products and processes set forth above without departing from the spirit and scope of this invention.

What is claimed is:

1. An article comprising a substrate coated with an intumescent agent which is a polysulfonamido derivative of a polycyclic aromatic compound wherein all aromatic rings are fused rings or rings separated by a valence bridge.

2. The article of claim 1 wherein the intumescent agent is a polysulfonamido derivative of a polycyclic aromatic hydrocarbon.

3. The article of claim 2 wherein the polycyclic aromatic hydrocarbon is naphthalene, anthracene, phenanthrene, biphenyl, or terphenyl.

4. The article of claim 3 wherein the intumescent agent is p,p'-disulfonamidobiphenyl.

5. The article of claim 3 wherein the intumescent agent is a naphthalenedisulfonamide.

6. The article of claim 5 wherein the intumescent agent is 1,5-naphthalenedisulfonamide.

7. The article of claim 5 wherein the intumescent agent is 2,6-naphthalenedisulfonamide.

8. The article of claim 5 wherein the intumescent agent is 2,7-naphthalenedisulfonamide.

9. The article of claim 5 wherein the intumescent agent is 1,6-naphthalenedisulfonamide.

References Cited

UNITED STATES PATENTS

| | | | |
|---|---|---|---|
| 3,535,130 | 10/1970 | Webb | 117—136 X |
| 2,671,771 | 3/1954 | Simons | 260—18 X |
| 3,179,634 | 4/1965 | Edwards | 117—136 X |
| 3,234,190 | 2/1966 | Tashlick | 156—331 X |

FOREIGN PATENTS

| | | | |
|---|---|---|---|
| 500,607 | 2/1939 | Great Britain | 260—556 |
| 121,764 | 7/1946 | Australia | 260—556 |

OTHER REFERENCES

Huntress et al., Jour of Amer Chem. Soc., vol. 62, pp. 603–604 (1940).

Chemical Abstracts, vol. 72, No. 4262 (1970).

WILLIAM D. MARTIN, Primary Examiner

H. J. GWINNELL, Assistant Examiner

U.S. Cl. X.R.

106—15 FD